Dec. 17, 1963   B. C. STOCKMANN   3,114,157
RAFTS
Filed July 13, 1959   7 Sheets-Sheet 1

INVENTOR.
BERNARD C. Stockmann
BY
Joseph A. Rave
Attorney

Dec. 17, 1963   B. C. STOCKMANN   3,114,157
RAFTS
Filed July 13, 1959   7 Sheets-Sheet 3

INVENTOR.
BERNARD C. STOCKMANN
BY
Joseph A. Rave
Attorney

Dec. 17, 1963

B. C. STOCKMANN 3,114,157

RAFTS

Filed July 13, 1959

INVENTOR.
BERNARD C. STOCKMANN

BY

Joseph A. Rave

Attorney

United States Patent Office 3,114,157
Patented Dec. 17, 1963

3,114,157
RAFTS
Bernard C. Stockmann, Cincinnati, Ohio
(3754 Feldkamp Ave., Bridgetown, Cincinnati 11, Ohio)
Filed July 13, 1959, Ser. No. 826,703
2 Claims. (Cl. 9—11)

This invention relates to improvements in rafts particularly rafts of the pleasure type as used on rivers, lakes and the like for the purpose of cruising, fishing, hunting and the like.

The principal object of the invention is the provision of a raft that may be transported as a trailer from point to point and yet have considerable area when in use.

Another object of the invention is the provision of a raft that may be collapsed or retracted in width and trailed behind a vehicle, such as the ordinary automobile, and expanded or extended after being placed upon the body of water with which it is to be employed.

A further object of the invention is the provision of a raft that can be erected from knocked-down parts without the used of any particular special tools except as found in the average individual's tool box.

A further object of this invention is the provision of pontoons for use in making or floating a raft and which are provided in sections adapted to be assembled in various combinations for providing rafts of selectable lengths and which sections may be readily replaced in the event of damage to any one of them.

A still further and specific object of the present invention is the provision of a raft which will accomplish the foregoing objects that is of relatively simple construction wherefore it may be economically produced and acquired.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

FIG. 3 is an enlarged, fragmentary, horizontal, staggered, sectional view as seen from line 3—3 on FIG. 2, with certain portions being removed in the interest of clearity in disclosure.

Throughout the several views of the drawings similar reference characters are employed to denote the same or similar parts.

As was noted above this invention relates to improvements in rafts such as would be employed on rivers, lakes, and the like, for cruising as a base for swimming or diving, for fishing and/or hunting. Rafts for these purposes have in the past been produced but were generally of a rigid or fixed construction wherefore they remain in, or on, the water and were moved from the water over land only with great difficulty or had to be disassembled and the parts trucked. The present raft is collapsable, particularly in width, so that it may be readily trailed behind a small truck or the average pleasure automobile in the same manner as other marine craft loaded on a particular boat trailer. By the construction hereinafter particularly set forth the raft of the present invention, therefore, may be transported with the same ease and facility as any other water craft trailer with its craft mounted thereon.

It should be noted that by "raft" as herein used is meant a relatively flat platform or deck supported on pontoons along two edges or sides thereof as distinguished from other water craft which employ a hollow hull into which the person, gear, and the like, are disposed. As will presently be made clear, the raft of the present invention while utilizing, primarily, said relatively flat platform or deck, the same is encircled by means to prevent inadvertent loss from the said flat platform or deck while in use.

As further will be presently made clear the raft of the present invention may be made to a size dictated by the desires of the user yet it is believed that a practical and desirable size would be one having overall dimensions of approximately sixteen feet in length and six feet in width, when collapsed, and which raft may be extended to approximately nine feet in width after launching on the body of water with which it is to be temporarily used, it being understood that prior to, preferably and most conveniently, the removal of the raft from said body of water the raft is collapsed to its trailing size.

Specifically, and, in general, the raft of the present invention comprises a pair of longitudinally extending pontoons 20 and 21 joined in spaced relation by expansible, or extendible, means, indicated in general by the reference numeral 22 in FIG. 3. Disposed on or above said expansible or extendible means 22 is the platform or deck, indicated in its entirety by the reference numeral 23. Upstanding from said pontoons and their connecting means is means substantially encircling the said platform for preventing inadvertent loss from the platform of either gear or persons and which means is indicated in its entirety by the reference numeral 24 and may in general be referred to as a fence or railing.

Figure 1:
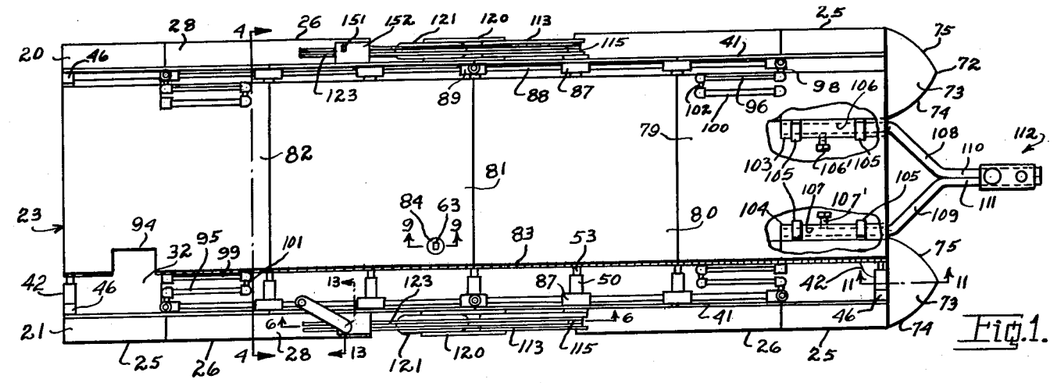
FIG. 1 is a top plan view of a raft embodying the principles of the present invention in its collapsed or retracted condition so that it may be transported as a trailer.
Figure 2:
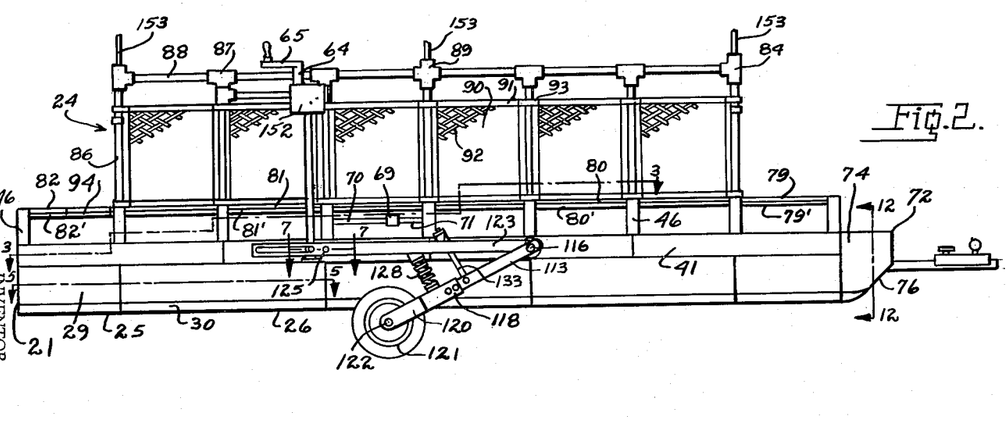
FIG. 2 is a side elevational view of the raft of FIG. 1 as seen, for example, from the lower side of said FIG. 1.
Figure 5:
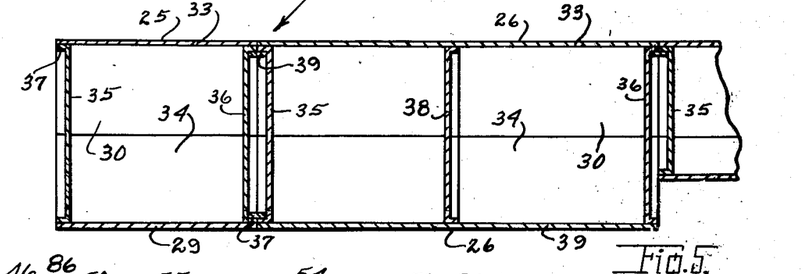
FIG. 5 is an enlarged, horizontal, sectional view through a portion of one of the pontoons forming a detail of the invention and as seen from line 5—5 on FIG. 2.

Each pontoon is made up of a plurality of sections, two of which sections are illustrated in FIG. 5 and respectively identified by reference numerals 25 and 26 with said section 25 being illustrated as of a length equal to substantially one-half of the length of the section 26. Without intending to be a limitation the said length of section 25 may be two feet while the length of section 26 would be four feet. As seen in FIGS. 1 and 2 each of the pontoons is made up of three sections similar to section 26 with a section 25 at each end of said sections 26.

Figures 4, 23:
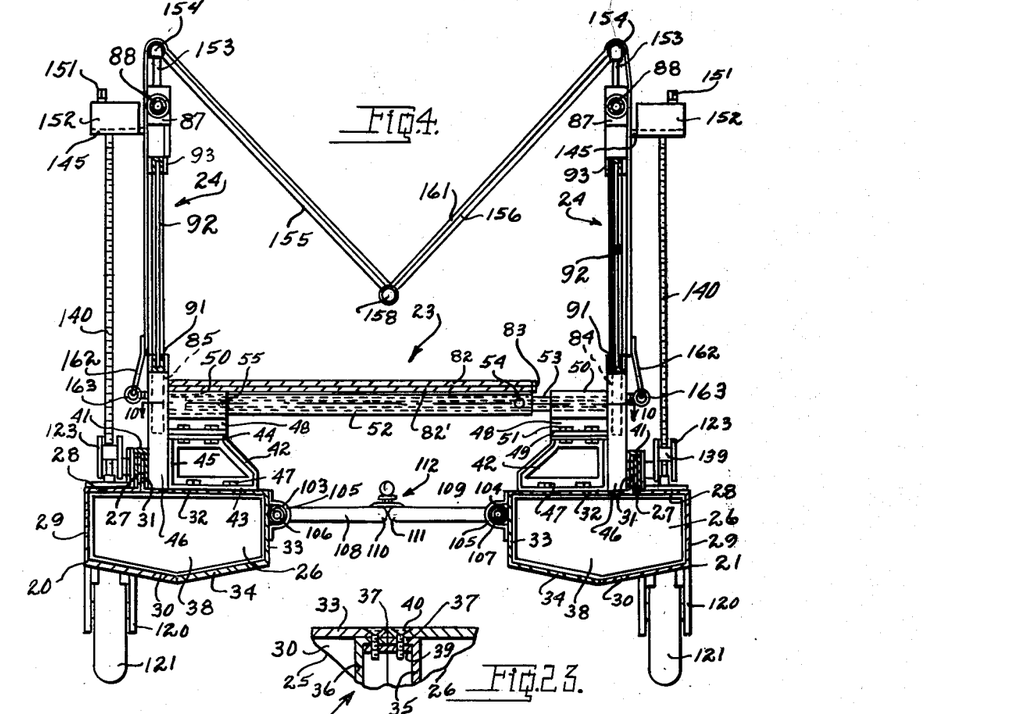
FIG. 4 is an enlarged, transverse, sectional view through the raft in FIG. 1 as seen from line 4—4 on said FIG. 1.
FIG. 23 is an enlarged, fragmentary, sectional view of a portion of FIG. 5, as indicated.

Transversely each pontoon is substantially rectangular in area with the lower side formed as a shallow V. In practice, and forming a detail of the invention, each pontoon section is formed of two portions of slightly dissimilar area with the outer portion of each pontoon section including an upstanding tongue or rib 27, an outwardly projecting horizontal top portion 28, a depending side 29 and a bottom V portion 30. The inner portion of each pontoon section is likewise provided with an upstanding tongue or rib 31, an inwardly projecting horizontal top portion 32, of somewhat greater length than the top portion 28, a depending side 33 and a downwardly inwardly inclined bottom V portion 34. In practice the said outer and inner pontoon portions of each pontoon section are arranged as illustrated in FIG. 4 with each having its upstanding tongue or rib 27 and 31 in face contact and with each having the inner edge of its downwardly inclined V portions 30 and 34 in contact and with said contacting tongues or ribs and bottom portions edges welded at one another throughout their lengths.

Each section of each pontoon has its opposite ends closed by a head member, respectively, 35 and 36, see FIG. 5, which, respectively, includes a body portion of an area and configuration substantially equal to the inner area of the pontoon section and with each head body portion having a peripheral outwardly projecting flange 37 which underlies the pontoon section top portions 28—32, the pontoon depending sides 29 and 33 and the pontoon bottom portions 30—34. The said heads are secured by welding the outer edges of its peripheral flange 37 with the outer edges of the pontoon section top, sides and bottom for thereby providing an air and water tight pontoon section. Since the said pontoons are formed of relatively thin sheet metal, such as aluminum, the longer sections, section 26, are each preferably provided substantially centrally thereof with a brace 38 in contour and construction substantially identical with the heads so that suitable and ample strength is given the pontoons.

The said pontoon sections are secured to one another in such a manner that they may be separated, if desired, for replacement of a damaged section, and further said pontoon sections are connected to one another in such a manner that they may be utilized in any desirable combination of long and short sections. Accordingly advantage is taken of the space between the end heads body portions as provided by their peripheral flanges in that a connecting strip or bar 39 is disposed at desired intervals within said space to receive securing screws 40 which pass through the overlapped and welded end edges of the pontoon sections and head flanges 37 and which connection of the pontoon sections is effected without in any manner breaking or disrupting the welded point between the pontoon section head and its top, sides and bottom.

In practice and for additional strength in connecting the pontoon sections to one another the upstanding welded tongues or ribs 27 and 31 are embraced by a sheet of material, indicated by the reference numeral 41. This embracing or sheathing sheet is preferably applied in sections longitudinally of the said secured tongues or ribs and with the breaks or ends abutments of said sheathing sheet alternating with the abutment of the pontoon sections so that the abutting edges of said pontoon sections and particularly the abutting edges of their upstanding tongues or ribs are reinforced.

The pontoon sections are arranged, as noted above in end to end contact and with the tops, 28 and 32, of the inner and outer portions in alignment with one another and with said aligned tops 28 forming a cat-walk outwardly of a deck or platform as will presently be made clear. The pontoon sections inner portions tops 32 are employed to support and have secured thereto the pontoons expanding or separating mechanism indicated in general by the reference numeral 22. This separating mechanism comprises a plurality of substantially identical brackets 42 each having a horizontal base 43 and a horizontal top portion 44. At its outer vertical side 45 each bracket 42 may have secured thereto, but preferably has integral therewith, an upstanding post 46. The brackets 42 are mounted in transverse alignment and are preferably mounted over the abutting joint of the pontoon sections and over the central portion of each pontoon long section 26. Disposed beneath each bracket base 43, preferably within the space as provided by the head flanges 37 is a reinforcing bar so that suitable bracket securing and mounting bolts 47 may be employed for securing each bracket in position.

As illustrated in the drawings several pontoon expanding and/or separating means may be employed for separating the pontoons to their most desirable position, that illustrated most clearly in FIGS. 3 and 4 will now be described.

Disposed on each bracket horizontal top 44 is a carrier casting including a body portion 48 with a bottom 49 at its lower end and a sleeve 50 at its upper end. The carrier casting bottom 49 is disposed on the bracket horizontal top 44 and secured thereto by bolts or the like 51. The sleeves 50 of opposed carriers have slightly different diameter bores, that to the left as shown in FIG. 4, and at the top as shown in FIG. 3 having a slightly larger diameter bore and being adapted to receive and have secured therein a tube 52 having a bore therethrough of a diameter to receive a second sleeve or tube 53 carried by the opposed carrier obviously having a smaller bore. In other words the tubes or sleeves 52 and 53 are of such diameters to telescope within one another and to have a close but sliding fit within one another and wherefore their respective carriers are provided with bores to receive them. As will be seen from FIG. 3, as well as FIG. 1, a plurality of telescoped sleeve mechanisms are employed with the same equally spaced from one another from end to end of the pontoons and that the said pontoons are secured to one another in spaced apart relation depending upon the degree or amount of telescoping of the sleeves or tubes carried thereby.

Figure 10:
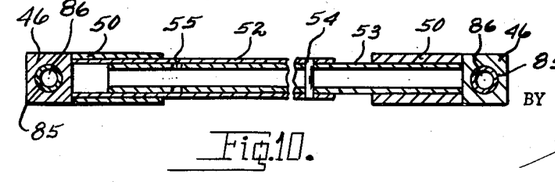
FIG. 10 is a fragmentary, sectional view through certain parts as seen from line 10—10 on FIG. 4 and forming a detail of the invention.

As illustrated in the drawings in FIGS. 3 and 4 the raft pontoons are in their retracted position with the tubes or sleeves 52—53 telescoped substantially their full length and with said parts secured or retained in this position by means of a pin 54 extending through aligned apertures, see particularly FIG. 10. The said pontoons are adapted to be separated from one another and then secured, again, in said separated position and which securing means may employ the said pins 54 extending through suitably aligned apertures including the aperture 55 near the inner end of the inner tube 52, see FIG. 10. It should be noted, however, that the tubes 52—53 need not be locked in their extended positions as the platform or deck may be so employed as will be made clear.

Figure 9:
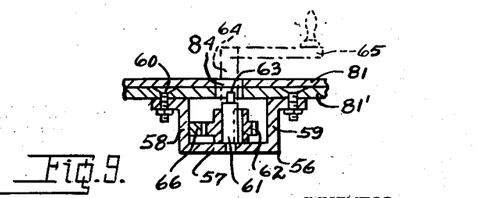
FIG. 9 is a fragmentary, sectional view through the means for extending the raft pontoons from their collapsed to their extended positions as seen from line 9—9 on FIG. 1.

Any suitable or desirable means may be employed for effecting the separation of the pontoons from one another, that disclosed in the drawings having been found to be an acceptable and efficient means. Specifically said separating means, as illustrated in FIGS. 3 and 9, comprises a bracket member 56 including a base member 57 having upstanding from its ends arms 58 and 59 through which the bracket 56 is secured through bolts 60 to a fixed portion of the raft, and which portion of the raft will be subsequently identified. The bracket 56 supports for rotation a stub shaft 61 to which is suitably keyed a rack pinion 62. The upper end of the stub shaft 61 is provided with a reduced portion 63 of angular cross-section and adapted to be received in a socket 64 of an actuating lever 65. The actuating lever 65 and its socket 64 are illustrated in phantom lines in FIG. 9 since it is merely an operating device that has no particular part in the construction of the raft. Meshing with the rack pinion is a rack 66 which is secured to the remaining pontoon in any suitable or desirable manner. As illustrated in FIG. 3 the rack 66 has projecting therefrom a tongue 67 disposed and pinned in the end of a tube or pipe 68 which has its other end connected through a pipe T 69 to pipe sections 70 and 71 secured between the upstanding post 46 of two adjacent brackets 42; said adjacent brackets being preferably near the longitudinal center of the raft and particularly the pontoons carrying the same.

Figures 11, 21, 22:
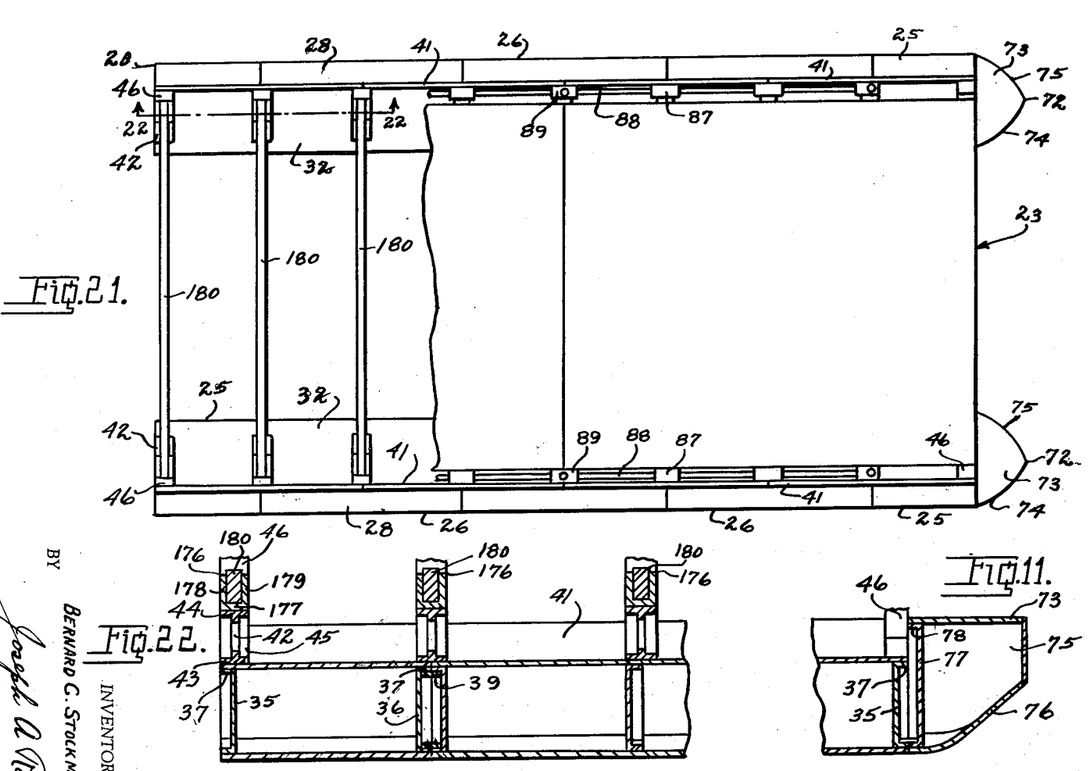
FIG. 11 is an enlarged, longitudinal, sectional view through the front or nose end of a pontoon as seen from line 11—11 on FIG. 1.
FIG. 21 is a plan view, similar to FIGS. 1 and 17, showing a raft of modified construction but embodying the principles of the present invention.
FIG. 22 is an enlarged, fragmentary, sectional view through a portion of the modified raft in FIG. 21 as seen from line 22—22 on said FIG. 21.
Figure 12:
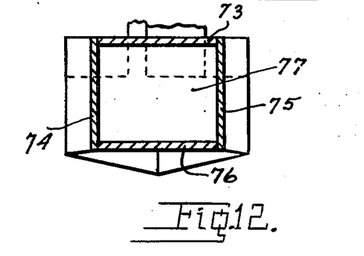
FIG. 12 is an enlarged, transverse, sectional view through said front or nose end of the pontoon as seen from line 12—12 on FIG. 2.

The forward ends of each pontoon carries an especially designed pontoon section indicated in its entirety by the reference numeral 72. As illustrated in FIGS. 11 and 12 the said pontoon sections 72 are each of a height equal to the height of the other pontoon sections when including their upstanding tongues 27 and 31 and said forward or nose pontoon sections 72 are each of a width equal to that of the other pontoon sections and including the lateral sides 29 and 33. Each of said forward pontoon sections 72 includes a top 73 of a generally spear head formation, as seen in plan in FIG. 1, and has depending from each of its lateral sides side plates 74 and 75. The said side plates have their lower edges biased or upwardly inclined for a portion of their length and to the lower edges of which side plates 74 and 75 is secured a bottom plate 76. The bottom plate 76 not only has a contour in plan similar to the top plate 73 but said bottom plate inwardly of its end adjacent the first regular pontoon section has its V-shaped bottom portion convergingly inclined to the same degree as the bottom portion 30—34 of said adjacent pontoon section. The open inner end of said forward or nose pontoon section 72 is provided with a reinforcing and sealing head similar in all respects to the heads above set forth and as located at the opposite ends of each pontoon section. Said pontoon forward or nose section head therefore includes a body portion 77 of an area substantially equal to the area of said pontoon section open end and with said body portion having a peripheral rim 78 to cooperate, in the main, with the corresponding peripheral rim of the adjacent pontoon section head for securing these parts to one another through brackets and screws similar to those above described and identified by the reference numals 39 and 40.

The raft platform or deck 23 is formed of a plurality of sections due, obviously, to the ultimate size or area thereof. Said platform or deck is conveniently formed of plywood panels of the kind that are moisture proof and utilized in similar situations with respect to water craft, trucks, and the like that are frequently thoroughly soaked with water. As illustrated in FIGS. 1 and 4 the said deck or platform is provided with, in its retracted or collapsed position, with super-imposed panels 79, 80, 81 and 82 with the lower or underneath panels extending from the post 46 of the brackets 42 carried by one of the pontoons. Specifically, said construction, as seen in FIG. 4, has the lower panel section 82′, for example, with its left hand longitudinal edge secured in any suitable or desirable manner to the carrier sleeves 50 upper surfaces and which for this purpose are preferably flat. The said lower panels, as exemplified by 82′, in FIG. 4, therefore extends to the right and has super-imposed thereon the upper panel 82. The right hand edges of said panels 82 and 82′ are secured to one another by a hinge 83 wherefore, and at the appropriate time, said upper panel, such as 82 in FIG. 4, or the similar panel of superimposed panels 79—82, may be lifted from its underneath panel and swung on its hinge 83 to be outwardly or to the right, as seen in FIG. 4, of said secured lower panel.

The appropriate lower panel of the set, lower panel 81′, shown only in FIG. 9, constitutes the fixed portion of the raft or the fixed portion of one of the pontoons, to which the raft extending means, the bracket 56, is attached and relative to which the rack 66 is moved in extending the raft or separating the pontoons thereof.

From the foregoing it will now be appreciated that there has been provided a raft including spaced apart pontoons that can be secured relative to one another a distance which would be safe to move as a trailer behind a prime mover, such as a ordinary automobile, while said pontoons may be extended from one another to provide a distance and area as desired for cruising, fishing, hunting, and the like. It will further be noted that the said pontoons may be locked in their relatively close or retracted positions as well as in their extended positions. Also it will be noted that there has been provided a deck or platform which is retractable or diminishable in area upon the retraction of pontoons and can be extended upon the separation of the pontoons.

It should be noted that the raft platform or deck panels when in super-imposed relation are provided with aligned perforations 84 through which the socket 64 of operating crank 65 is projected to effect association thereof with the stub shaft 61 in order to actuate the rack pinion 62 and rack 66. It will be understood that this aperture 84 is of insufficient diameter to cause any inconvenience to users of the platform or deck.

Disposed upwardly of the platform or deck, whether with its panels in a super-imposed position or extended position, is a fence, railing, or enclosure. This railing or enclosure is formed by providing each of the brackets upstanding post 46 with a socket 85 into each of which is secured a hollow upright or post 86. Each of said hollow uprights or posts 86, except the center ones for a reason subsequently to be made clear, carries a pipe T 87 with a connecting pipe 88 between adjacent T's thereby forming a substantially rigid frame upstanding from each pontoon. The end pipe T's 87 are arranged at right angles to the intermediate pipe T's for a purpose subsequently to be made clear and substantially at the lengthwise center of the pipe frame there is provided a pipe cross 89 instead of a pipe T, again for a purpose subsequently to be made clear. Disposed between adjacent uprights or pipes 86 and below their upper ends connecting pipes 88 is a metal panel 90 which includes a peripheral or bounding frame 91 and a central portion 92 which is of open work and may take the form of well known expanded metal or wire cloth or heavy screening. The said panels 90 are secured in position by means of tie straps 93 located at the upper and lower ends of each panel 90 and extending across the uprights 86 for securement of both the upper and lower ends of each panel to said uprights.

It is contemplated that the raft will be propelled by a propelling mechanism such as a gasoline motor driven propeller of the kind generally referred to as an "outboard motor." For this purpose, see FIG. 1, the end deck or platform panels 82—82' are each provided inwardly of their outer end with a cut-away portion indicated in said FIG. 1 by the reference numeral 94 and through which the said propeller of the "outboard motor" (not shown) projects with the motor itself disposed above the said platform or deck to be controlled and operated from said platform or deck.

It will be noted that the enclosing fence or railing sides of the raft stop short of the ends of the pontoons thereby, at the rear end of the raft, placing the "outboard motor" beyond the fence or railing sides and at the same time providing a similar portion at the front end of the raft platform or deck. These unrailed or unfenced portions of the platform or deck may be referred to as the "front" and "back" porches. In order to separate the said front and back porches from the platform or deck proper a suitable transverse protecting railing or fence is provided which is substantially identical in all respects with the side railing except that the panel portions of the front and rear railing are hinged to one another so that they may be swung out of the way during the manipulation of the platform or deck panels with respect to one another and either to their super-imposed positions or extended positions.

Specifically the fence or railing transversely of the raft comprises a plurality of similar panels and which in turn are similar to the side panels 90 with the said transverse fence or railing end panels 95 and 96, respectively, hingedly connected at 97 and 98 to an opposite side fence or railing end upright or post 86. Each of said panels 95 and 96, in turn, has hingedly connected with its free end a second panel 99 and 100 through hinges 101 and 102. It is believed obvious that by this construction the end fences and railings, since they are identical in construction, can have their panels folded on one another, as shown for example in FIG. 1, so that the platform or deck panels can be manipulated to their proper positions and subsequently positioned transversely of the raft platform or deck.

As was noted above it is in the retracted position of the raft, that is, in the retracting positions of the pontoons, that the raft is transported from place to place behind a prime mover, such as the average automobile. Any suitable means may be provided for effecting a connection between the raft and said prime mover such as that shown in the drawings which has been found to be quite satisfactory and which will now be described.

The mechanism or connecting means consists of securing, respectively, to the inner side of each of the pontoons first section, that is, the side 33, a pipe or tube 103 and 104 with said pipes or tubes respectively secured by straps 105. The connecting means itself consists of a pair of additional pipes or tubes each including a horizontal portion 106 and 107 of a diameter to closely but slidingly fit, or telescope, within said first mentioned pipes or tubes 103 and 104, respectively. Said sliding tube portion 106 and 107 have respectively an integral, inwardly, angularly extending portion 108 and 109 and which are respectively followed by horizontal portions 110 and 111 which have their inner surfaces in contact with one another and securely welded to one another. The said portions 110 and 111 of said sliding tubes together constitute or form a tongue to the upper surface of which is secured the usual, and well known, "hitch" 112, and which includes the adjustable or tightening means that engages cooperating means of the "hitch" carried by the prime mover, not shown. The telescoped tubes or pipes 103—106 and 104—107 are secured in their telescoped positions by any suitable or desirable means such as bolts 106' and 107'.

For the purposes of the present application it is believed unnecessary to further describe or define the "hitch" since such a mechanism is relatively well known and includes a substantially sphere shaped member with which the socket of the other member, herein indicated by the reference numeral 112, cooperates to provide a movable joint between the trailer and the prime mover and whereby, as is well known, corners are navigated and the usual undulations in roadways are likewise traversed.

In order that the raft may be transported it is provided with its own wheel suspension, there being a separate but substantially identical similar wheel supporting mechanism on each side of the raft and it is deemed sufficient if but one of said wheel supporting mechanisms be defined for each.

Figure 6:
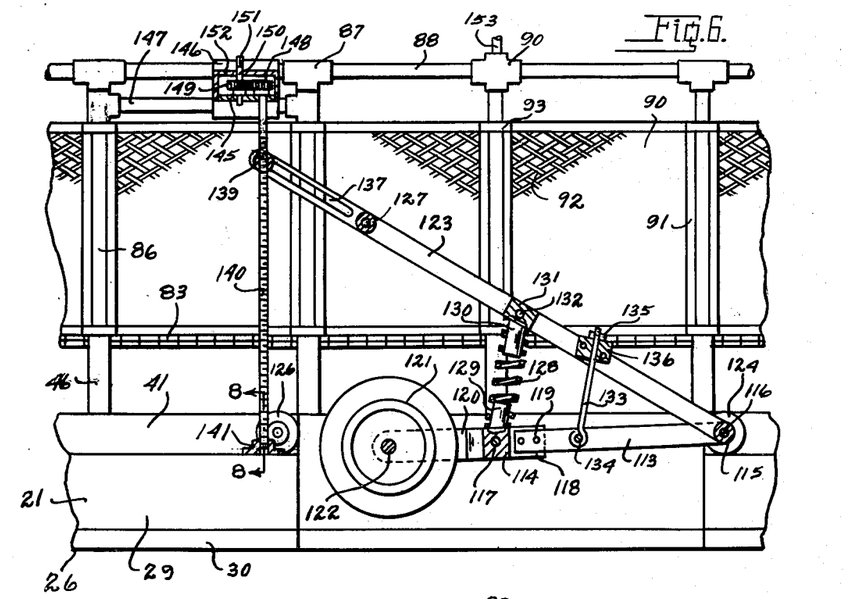
FIG. 6 is an enlarged, sectional view, partly in elevation, through the transporting wheels or carriage for the raft while being trailed and as seen from line 6—6 on FIG. 1.

Accordingly, and with reference particular to FIGS. 3 and 6 said wheel supporting mechanism comprises a carrying arm 113 preferably formed of spaced apart similar members having between their opposite ends spacers 114 and 115. The spacer 115 is in the form of a bushing or sleeve and is centrally apertured or bored to have extending therethrough a pivot member or bolt 116. The other spacer member 114 is in the form of a block again, and for a purpose later to be made clear, is pivoted through a pin 117 in operative position. Secured to the arm 113 is a clevis or fork which is again formed of a pair of members each including a parallel portion 118 through which bolts 119 pass for securing it to the arm 113. Each fork member includes a second or offset portion 120 that straddles a wheel 121 and which conveniently takes the form of a rubber tired wheel. Extending through the free ends of the fork portion or arms 120 and the wheel 121 is the usual axle 122 for the said wheel.

In practice the wheel carrying arm 113 downwardly and rearwardly extends as shown in FIG. 2 so that said wheel is below the pontoons a sufficient distance to prevent any interference between the road and the lower edge of the pontoons.

In order to retain the arm 113 and therefore the wheel 121 in said lower position the said arm 113 has rigidly connected to its outer end a raising and lowering arm 123, and which arm similar to the carrying arm 113 is provided as two similar members each having its one end outwardly of its adjacent carrying arm member 113 and with said arm ends suitably apertured to have pass therethrough the pivot member or bolt 116. The bolt 116 is secured in position by being secured or threaded into a bracket 124 secured to the exterior surface of the pontoon upstanding tongue as illustrated in FIG. 3. The said carrying arm is secured in its raft supporting position through a bolt 125 which passes through aligned suitable apertures near the other end of the carrying arm members 123 and said bolt is suitably threaded into a bracket 126 similar to the bracket 124 and again carried by the pontoon upstanding tongue. Conveniently, there is provided between the said raising and lowering arm members 123 at this point a spacer 127 which is provided with a bore concentric with the said raising and lowering arm members bores and through which extends the said securing bolt 125.

There is provided between the wheel carrying arm 113 and the raising and lowering arm 123 a shock absorbing spring 128 and which is held in operative position by a lug or tongue 129 projecting from the pivotly mounted spacing block 114. The other end of said shock absorbing spring 128 is retained in operative position by means of a second tongue 130 downwardly projecting from a spacing block 131 between the arm carrying members 112 and with said spacing block 131 being located intermediate the ends of the carrying arm members and secured through a pivot pin 132. A tie bar 133 is provided between the carrying arm 113 and the raising and lowering arm 123 with said tie bar having a pivotal connection at 134 with the said carrying arm 133 and having a slidable and movement limiting connection at 135 and a further spacing block 136 between the raising and lowering arm members 123.

Through the mechanism just described and as illustrated in its load carrying position in FIG. 2 it is believed obvious that the collapsed or retracted raft can be readily transported as a trailer. It is desired however to raise the wheel 121 above the water level after the launching of the raft and wherefore the said raising and lowering arm members 123 outwardly of their connecting block 127 are each provided with an elongated aperture 137 respectively receiving a trunnion 138 projecting from each side of a nut 139. The nut 139 is threaded on a lead screw 140 which upstands from the pontoon and particularly from the top portion 28 of a section thereof and outwardly of the upstanding tongue.

Figures 7, 8:
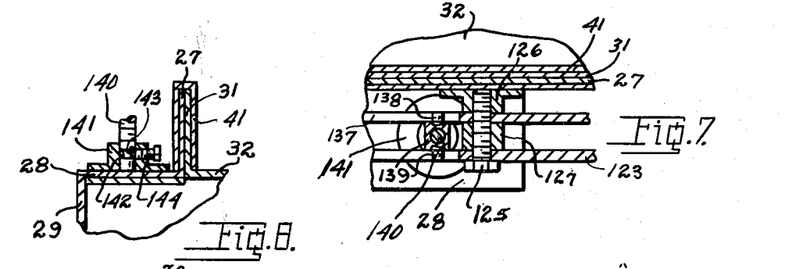
FIG. 7 is an enlarged, fragmentary, sectional view taken on line 7—7 on FIG. 2 and illustrating the locking of the supporting carriage in its supporting position.
FIG. 8 is an enlarged, sectional view through a portion of the supporting carriage mechanism as seen from line 8—8 on FIG. 6.

The lead screw 140 is arranged in its upstanding position by having its lower end rotatably mounted in a bracket 141 secured to the aforesaid pontoon top portion 28. The said lead screw 140 while adapted to be rotated within the bracket 141 is to be retained against inadvertent axial withdrawal therefrom and for this purpose said lead screw is provided upwardly of its lower end with a circumferential groove 142 into which projects the nose 143 of a retaining screw 144. It is believed that the construction and operation of this mechanism is obvious from FIG. 8.

The upper end of the lead screw 140 passes through the base plate 145 of a bracket 146 carried by the upper end of the raft enclosing railing or fence side members. Any suitable or desirable means may be provided for securing the said bracket 146 in position, that illustrated consisting of a second pipe or tube 147 extending between adjacent upright post 86 and parallel with the upper pipe 88 of the said side fence or railing. The bracket base plate 145 provides a bearing for the said upper end of the lead screw 140 and said lead screw has keyed or otherwise secured thereto above said bracket base a suitable gear 148. Mounted on the bracket base 145 is a gear pinion 149 meshed with the lead screw gear 148 and with said gear 149 having projecting therethrough to upstand thereabove a pinion shaft 150 provided at its upper end with a reduced angular portion 151. For convenience the angular portion 151 of the pinion shaft 150 may be similar to the angular portion 63 of the pinion shaft 61 wherefore the socket 64 of actuating crank or lever 65 may be connected therewith for rotating the pinion and therefore the gear 148 and lead screw 140. A suitable cover 152 may be provided and secured to the bracket base 145 for enclosing the pinion 149 and gear 148 and with said angular portion 151 of the pinion shaft 150 extending thereabove in order to have access thereto.

In practice, therefore, after the launching of the raft and the extension or separation of the pontoons thereof the securing bolt 125 is removed and whereupon the lead screw 140 is actuated for elevating the wheel 121 from the position shown in FIG. 2 to the position shown in FIG. 6 and thereby raising the said wheel above the water level of the launched raft.

The supporting wheel structure has been designed to have a length, in the main, no greater than the length of one of the longer pontoon sections and in order not to widen the raft beyond the safe width for trailing behind a prime mover it is built to be within the lateral limits of the trailer. For this reason the particular pontoon adjacent which the wheel mechanism is mounted has the top 28 dispensed with and the outer side of said pontoon section continued downwardly in the plane of the pontoon upstanding tongue or rib 27, see FIGS. 6 and 7.

Figures 13, 14, 15, 16, 24:
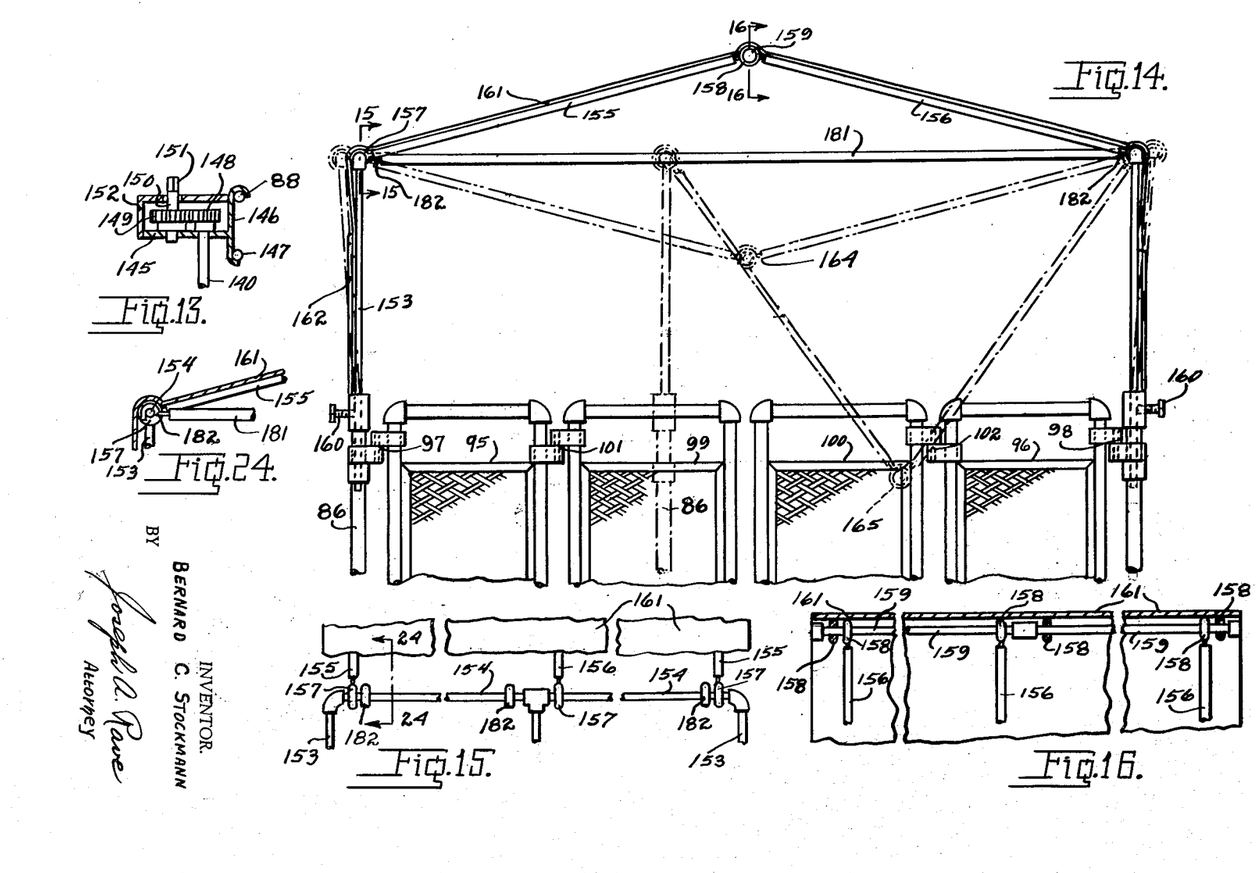
FIG. 13 is an enlarged, sectional view through a portion of FIG. 1 as seen from line 13—13 on FIG. 1.
FIG. 14 is a view of the upper part of the raft particularly showing the roof or cover of the raft.
FIG. 15 is a fragmentary, sectional view through a portion of the roof or cover as seen from line 15—15 on FIG. 14.
FIG. 16 is a fragmentary, sectional view through the central portion of the roof or cover as seen from line 16—16 on FIG. 14.
FIG. 24 is a fragmentary sectional view through the roof or cover structure as seen from line 24—24 on FIG. 15 and forming a detail of the invention.

The raft is provided with a collapsible cover or roof, see FIGS. 14, 15 and 16, and for which purpose certain of the railing or fence sides uprights or posts, such as the end post are each provided with its T 87 to have an open end upwardly and the said central post provided with the pipe cross 89 and therefore having an upwardly projecting open end. Into each of said end and longitudinal center posts, on each side of the raft, is disposed an upwardly extensible bar 153 joined to one another at their upper ends by longitudinally extending pipes 154. Mounted on said pipes are additional pipes or bars which may be considered rafters their being several such rafters on each side and with those on one side being identified by the reference numeral 155 while those on the other side are identified by the reference numeral 156. The said rafters 155—156 are each provided at its outer end with an eye 157 disposed on the longitudinal pipes 154 in such a manner that there is provided therebetween a hinge joint. Similarly, each of the rafters 155—156 is provided on its inner end with an eye 158 and which are adapted to be aligned with one another to receive a connecting bar which may be conveniently termed a ridge pole 159.

The said extensible bars, in practice, pipes or tubes 153, and their connecting longitudinal pipes, in effect, braces 154, along with the rafters 155—156 and the ridge pole 159 constitute a roof or cover frame and is adapted to be elevated or upwardly adjusted when the raft is afloat and secured in said position by dog or clamping screws 160 and the said frame is adapted to be lowered when the raft is collapsed and being trucked or transported from place to place. The said frame has attached thereto a flexible, preferably cloth, cover 161 wherefore the frame may be readily adjusted to its several positions as will presently be described.

As illustrated in FIG. 14 the said roof or cover is shown in solid lines in its upper operative position when the raft is afloat and therefore the extensible bars 153 are extended to their upper position and locked in said position by means of clamping screws 160, carried by the pipe T's 87 and pipe crosses 88. When the said frame is in this position the cover 161 is placed thereover and suitably secured thereto. Part of the securing of said cover or roof may include ropes 162 depending from the cover edges and which are tied to eyes at the outer end of clamp screws 163 in upstanding posts 46 said clamp screws 163 secure the extensible bars 153 in a lowered position, as will be made clear.

The roof frame, particularly the side or longitudinal braces 154 are secured in their spaced apart positions by a tie bar 181 having, respectively, at its opposite ends a hook 182, see particularly FIG. 24, and which hooks latch around the said braces 154 at each side of the raft roof.

When it is desired to collapse the raft for transportation purposes the tie bar 181 is first removed by unlatching its hook 182 for the longitudinal braces 154 whereupon pressure is applied to the ridge pole 159 by engaging the same from beneath the ridge pole and while standing on the raft platform or deck. A downward pull on the ridge pole 148 will cause the extensible bars 153 to outwardly spring a very short distance until the said ridge pole passes through a position in horizontal alignment with the pipes or longitudinal braces 154 and which ridge pole along with the rafters 155—156 will take the position illustrated in dotted lines at 164 in said FIG. 13. At this time the raft may be collapsed, that is, the pontoons drawn toward one another until they are in the positions with respect to one another as illustrated in FIG. 4 or as illustrated by the fence or railing upright 86 in phantom lines in said FIG. 13. This collapsing of the raft caused the ridge pole 159 and rafters 155—156 to take the positions illustrated therefore in phantom lines at 165 in said FIG. 13. The clamping screws 160 may now be loosened and the entire top or cover frame be lowered by the telescoping of the said top or cover frame extensible bars 153 within the railing uprights 86 and whereupon the said clamping screws 160 may again be actuated and the eye clamping screws 163 actuated for securing the cover or top in said collapsed position. It should be noted that the cover 161, per se, remained on the frame since, it being flexible, that is water proof cloth type material, it will follow the rafters during the collapse thereof and will follow the frame during the lowering to its lowermost position.

There is illustrated in FIGS. 17, 18, 19 and 20 a modified construction in so far as the pontoons collapsing or retracting and extending mechanism is concerned. The said modification instead of utilizing telescoping pipes or tubes utilizes for each, respectively, of said telescoping members a beam 166 and 167 which conveniently may take the form of a wooden beam such as the ordinary wooden beam generally identified as a "2 x 4." These beams 166 and 167, respectively, at its outer end is attached to a bracket 42 and preferably to the upstanding member or post 46 thereof with said attachment of the beam 166 being effected by a hinge 168 while the similar outer end of the beam 167 is attached to its bracket upright 46 by a hinge 169. The beams 168 and 169 extend toward one another and in fact have their inner ends on the longitudinal center of the raft and with said inner ends of the beams joined to one another by a hinge 170.

By this construction it is obvious that the pontoons may be drawn toward one another or extended away from one another and the said beams pivot with respect to one another on the hinge 170 and pivot with respect to their brackets on the hinges 168 and 169. In order to retain the pontoons in their collapsed or retracted positions for transporting purposes use is made at each end of the raft of a tie bar, respectively, 171 and 172 with said tie bar strapping or connecting the frontmost and rearmost beams to one another and with said straps being secured in position through screws 173 passing through the ends of the straps and respectively into a beam 166 and 167. It will be readily understood that any other suitable or desirable means may be employed to secure the straps 171 and 172 to their respective beams when in a collapsed or retracted position.

Figures 17, 18, 19, 20:
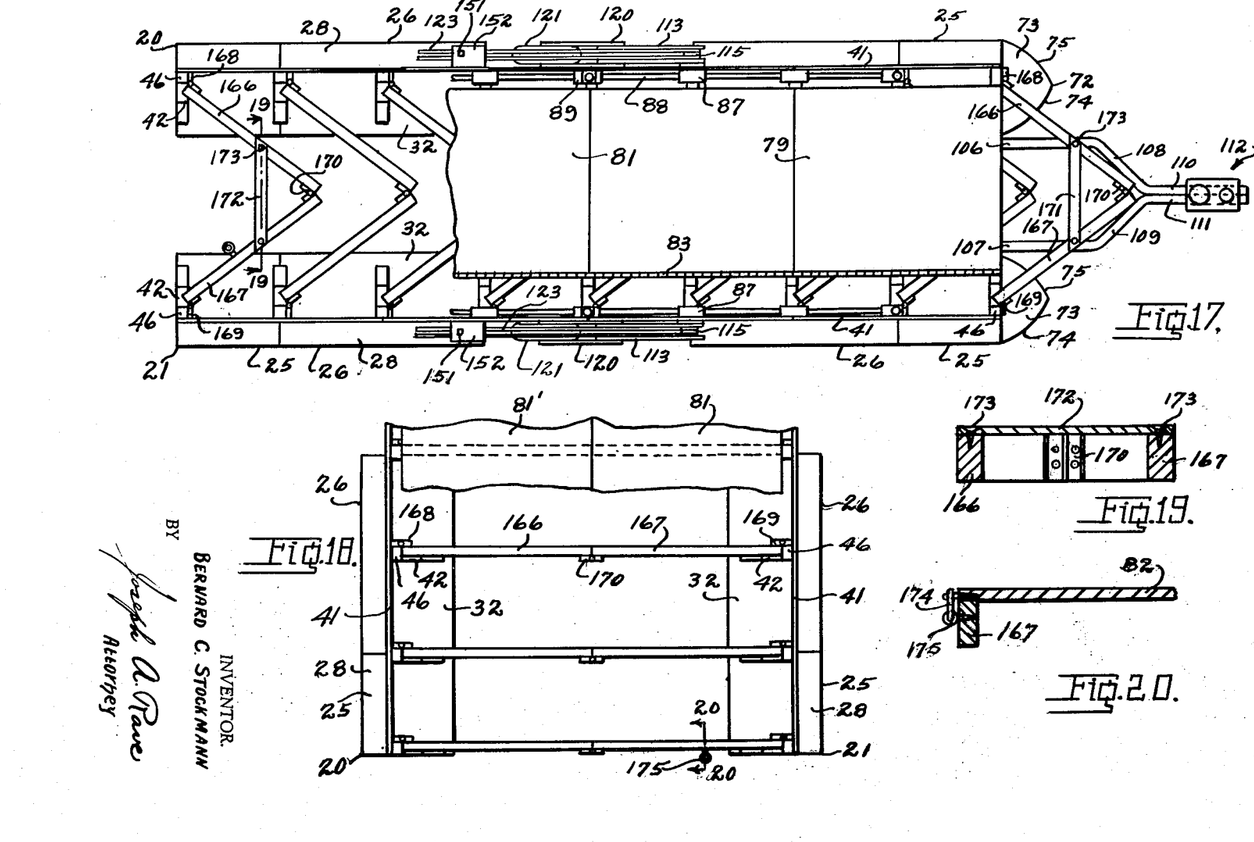
FIG. 17 is a view similar to FIG. 1 showing in plan a raft including modifications in the structure thereof, while embodying the principles of the present invention, and with parts being removed for clearness in illustration.
FIG. 18 is a plan view of a portion of FIG. 17 showing the parts in a second position of adjustment.
FIG. 19 is an enlarged, fragmentary, sectional view through a portion of the modified raft as seen from line 19—19 on FIG. 17.
FIG. 20 is an enlarged, fragmentary, sectional view through a second portion of the modified raft as seen from line 20—20 on FIG. 18.

The pontoons are maintained in their extended or separated positions primarily through the sections of the horizontal deck when in their extended or lowered positions as illustrated in FIG. 18. In other words since the under or lower platform or deck sections are secured to the pontoon brackets on one side while the free edge of the extended upper sections are against the brackets posts of the other pontoon no movement of the pontoons toward one another is possible. In order, however, to insure the parts remaining in their operative position one of the extensible platform deck section, the rearmost section 82, for example, is provided in its rear edge with a depending hook 174 cooperating with a hook eye 175 of the rearmost pair of extensible beams. Again, it is believed obvious, that any other suitable or desirable means may be employed for securing the parts in their operative position although it has been found that the hook and eye 174—175 is adequate for this purpose.

It is to be understood that the raft illustrated in FIGS. 17-20 has the same enclosing railing as above set forth and respectively carried by the deck sections and that a roof or cover similar to that above described may be employed.

There has been disclosed in connection with the said modified construction no expansible means such as the rack 66 and its actuating pinion 62 but it is to be understood that this mechanism may be incorporated in said modified construction. It has been found, however, that the hinged beams provide a mechanism whereby the said pontoons may be separated from one another manually, that is, by merely pushing on the side of the raft, actually the pontoon, which is free of the under or bottom section of the platform or deck after the said raft has been launched. Obviously some mechanical means would materially reduce the manual labor involved in separating the pontoons but the modified construction in FIGS. 17-20 does permit such a manual operation.

In the modifications of the raft of the present invention herein above described the pontoons thereof were adapted to be retracted toward one another or extended away from one another so that the same may be transported from place to place. It has been found that with very little modification the parts of the raft may be assembled with one another to provide a raft which would remain in or on the body of water and provide the same facilities as the collapsible raft.

Accordingly, as illustrated in FIGS. 21 and 22, the carrier casting 48 with their sleeves 49 would be removed from the supporting brackets 42 and in their place would be supplied the carrier brackets illustrated in cross-section in FIG. 22 and identified by the reference numeral 176. These carrier brackets 176 would be substantially U-shaped in cross-section and include a base 177 with an upstanding arm 178 and 179 at each of the base. The brackets 176 are secured to the horizontal top 44 of the bracket 42 in the same manner that the carrier castings 48 were secured.

Opposite U-shaped brackets 176 would each receive an end of a fixed, that is, non-collapsible or non-retractable beam 180 for thereby fixedly securing the pontoons in separated or extended positions. Any suitable or desirable means may be employed by securing the beams 180 in the bracket 176.

With this construction there need not be a platform or deck that is longitudinally divided with the lateral portions hingedly connected to one another, but instead a relatively fixed platform or deck of the entire area of the raft may be employed. As illustrated in the drawings the said platform or deck in FIG. 21 is made up of but two sections instead of the eight sections illustrated in the modifications above described.

It is believed obvious from the foregoing that there has been provided a raft which will accomplish the objects initially set forth.

What is claimed is:

1. In a raft of the class described the combination of a pair of opposed pontoons each extending the full length of the raft, cooperating means carried by each pontoon and connecting said pontoons to one another so that they may be drawn toward and extended from one another and locked in positions relatively near and relatively remote with respect to one another, a supporting and carrying wheel exteriorly of and extending below the lower surface of each pontoon for supporting the raft when its pontoons are in their relatively near position, hitch means carried by the pontoons when in said relatively near positions, a deck formed of sections superimposable on one another when the pontoons are in their relatively near positions and laterally positionable with respect to one another when the pontoons are in their relatively remote positions, an upstanding fence on each pontoon outwardly of the deck, a plurality of roof uprights carried by the fence at each side of the deck, said roof uprights being carried by said fence so as to be vertically shiftable from a lower inoperative to an upper operative position, roof rafters pivotally carried by the upper ends of each side fence, roof uprights with said roof rafters extending upwardly toward one another from each of said side fence roof uprights, a ridge pole pivotly connecting the inner ends of said roof rafters, and said roof uprights when in their upper operative position being sufficiently flexible to permit the ridge pole to be downwardly moved carrying with it the pivoted inner ends of the roof rafters and pivotally actuating the outer ends of the roof rafters on the roof uprights so that said roof may be collapsed between the raft side fences upon adjustment of the pontoons between their relatively near and remote positions.

2. In a raft of the class described the combination of a pair of opposed pontoons each extending the full length of the raft, cooperating means carried by each pontoon and connecting said pontoons to one another so that they may be drawn toward and extended from one another and locked in positions relatively near and relatively remote with respect to one another, a supporting and carrying wheel exteriorly of and extending below the lower surface of each pontoon for supporting the raft when its pontoons are in their relatively near positions, hitch means carried by the pontoons when in said relatively near positions, a deck formed of sections superimposable on one another when the pontoons are in their relatively near positions and laterally positionable with respect to one another when the pontoons are in their relatively remote positions, an upstanding fence on each pontoon outwardly of the deck, a plurality of roof uprights carried by the fence at each side of the deck, said roof uprights being carried by said fence so as to be vertically shiftable from a lower inoperative to an upper operative position, roof rafters pivotally carried by the upper ends of each side fence roof uprights with said roof rafters extending upwardly toward one another from each of said side fence roof uprights, a ridge pole pivotly connecting the inner ends of said roof rafters, said roof uprights when in their upper operative position being sufficiently flexible to permit the ridge pole to be downwardly moved carrying with it the pivoted inner ends of the roof rafters and pivotally actuating the outer ends of the roof rafters on the roof uprights so that said roof may be collapsed between the rafter side fences upon adjustment of the pontoons between their relatively near and remote positions, and a flexible cover carried by said roof rafters and uprights.

References Cited in the file of this patent
UNITED STATES PATENTS

| | | |
|---|---|---|
| 121,275 | Calkin | Nov. 28, 1871 |
| 684,878 | Sperber | Oct. 22, 1901 |
| 1,071,709 | Cracroft | Sept. 2, 1913 |
| 1,268,147 | Piosecki | June 4, 1918 |
| 1,652,581 | Roberts | Dec. 13, 1927 |
| 1,738,219 | Wickstrum | Dec. 3, 1929 |
| 2,457,567 | Kuns | Dec. 28, 1948 |
| 2,480,144 | Laycock | Aug. 30, 1949 |
| 2,555,220 | Brown | May 29, 1951 |
| 2,707,084 | Mills | Apr. 26, 1955 |
| 2,759,201 | McKinney | Aug. 21, 1956 |
| 2,808,846 | Jonsson | Oct. 8, 1957 |
| 2,823,684 | Sartori | Feb. 18, 1958 |
| 2,850,747 | Bouchard | Sept. 9, 1958 |
| 2,876,728 | Luger | Mar. 10, 1959 |